Sept. 8, 1931.     G. A. WELLMAN     1,822,719
FRICTION CASEMENT ADJUSTER
Filed Dec. 17, 1926

Inventor
Guy A. Wellman
Kwis Hudson & Kent
Attys

Patented Sept. 8, 1931

1,822,719

UNITED STATES PATENT OFFICE

GUY A. WELLMAN, OF GENEVA, OHIO, ASSIGNOR TO THE CHAMPION HARDWARE COMPANY, OF GENEVA, OHIO, A CORPORATION OF OHIO

FRICTION CASEMENT ADJUSTER

Application filed December 17, 1926. Serial No. 155,481.

This invention relates to friction casement adjusters and has for its object to provide a device which is an improvement over those in present use and further, one which is simple in construction and inexpensive to manufacture.

A further object of the invention is to provide means for adjusting the friction members of the device in such a manner that the said members will contact equally along their entire outer surfaces, thereby affording a greater contacting surface and nicety of adjustment than is possible with the present types of adjusters.

Another object of the invention is the provision of a supporting and attaching bracket for the adjuster which is capable of permitting the adjuster to be moved through a greater number of angular positions than is at present possible with the types now used, and further, to permit the adjuster to be attached whenever desired, to casements, the surfaces of which may be in different planes with respect to each other.

As a still further object of the invention there is provided means for limiting the longitudinal movement of the inner rod within the telescoping outer tubular member, when the same have once been assembled and secured to the casement or other hinged device, but without in any manner, interfering with the regulating of the friction therebetween or the free movement of one member within the other.

With the objects above indicated and other objects hereinafter explained in view, my invention consists in the construction and combination of elements hereinafter described and claimed.

Referring to the drawings.

Figure 1:
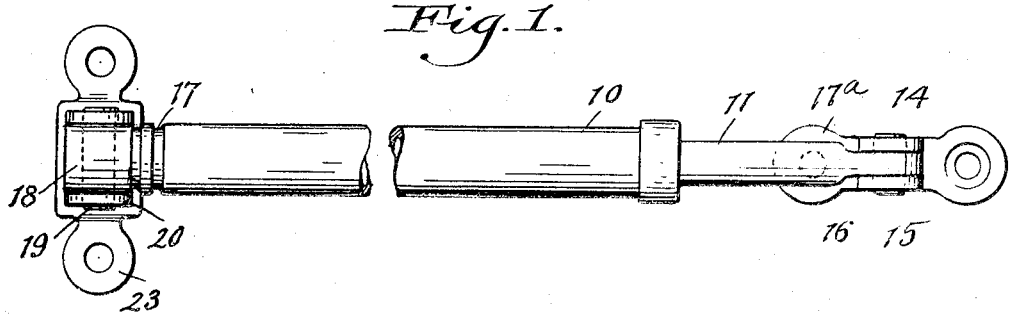
Fig. 1 is a top plan view of the casement adjuster.
Figure 2:
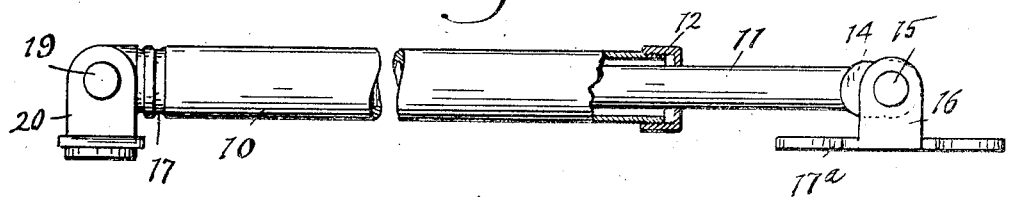
Fig. 2 is a side elevational view of the same.

In the drawings, 10 indicates an outer tubular member in which is mounted for longitudinal movement a rod 11, the latter being guided throughout its movement by a cap 12 in screw-threaded engagement with the inner end of the tubular member 10 and through which the rod extends. The outer end of the rod 11 has a flattened integral head 14 having a central opening, through which extends a pin 15, the ends of which are secured to a pair of ears 16 formed integral with the bracket 17$^a$. The bracket is provided with screw openings, preferably countersunk, so that it may be conveniently attached to some part of a casement, not shown.

The tubular member 10 has circumferentially extending inner ribs 17 formed at its outer end and a plug 18 having a reduced end portion provided with circumferentially extending grooves 18$^a$ which are adapted to engage the ribs 17 in such a manner as to permit the tubular member 10 to be freely rotated upon the plug 18, but at the same time preventing disengagement therebetween. The plug 18 is further provided with a transverse opening through which loosely extends a pin 19, the ends of which are secured in the upwardly extending ears 20 of a U-shaped member 21. The lower portion of the U-shaped member 21 carries a depending pin 22 which extends through an opening in an attaching plate 23, the lower end of the pin being peened over to prevent disengagement therefrom but at the same time permitting the U-shaped member to be freely rotated.

To provide a flat under surface for attaching the plate 23 to a portion of the casement, the central portion of the plate is pressed outwardly to form a channel 24 of sufficient depth to accommodate the end of the pin 22 without the same interfering with the attaching surface. The plate is also provided with suitable countersunk openings adapted to receive screws or other means, for securing the same to the casement.

Figure 3:
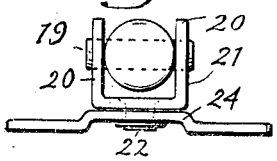
Fig. 3 is an end view of the bracket showing the manner in which the adjuster is secured thereto.

It will be readily seen, referring to Fig. 3, that a type of bracket has been employed which permits the tubular member 10 to be moved through a plurality of angular positions so that the casement adjuster may be secured to a suitable casement, or other pivoted structure in which the attaching surfaces of the casement lie in different angular planes.

Figure 4:
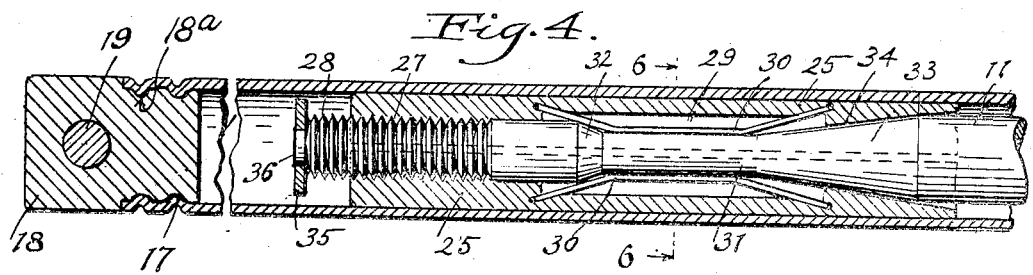
Fig. 4 is a longitudinal cross sectional view of a portion of said casement adjuster showing the means for regulating the friction between the telescoping members.
Figure 5:
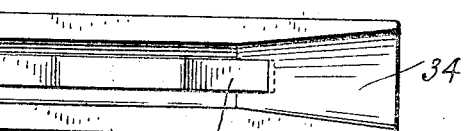
Fig. 5 is a plan view of one of the friction shoes.
Figure 6:
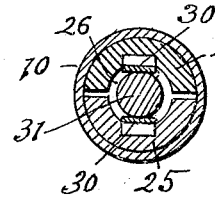
Fig. 6 is a cross sectional view taken on line 6—6 of Fig. 4.

Between the inner surface of the tubular member 10 and the rod 11 there is provided an adjustable friction member so arranged that the friction upon the inner surface of the tubular member may be adjusted by rotating the tubular member in the proper direction, while the adjuster is secured to the casement. This member consists of a pair of semi-circular friction shoes 25 of suitable length, which are spaced apart along their longitudinal surfaces, and which have a central cooperating bore 26, the outer end being screw-threaded at 27 to engage the reduced screw-threaded end 28 of the rod 11. Midway of the ends of the friction shoes 25 are oppositely disposed recesses 29 of suitable length, in which are secured the ends of flat springs 30 having parallel extending mid-portions which engage with the reduced portion 31 of the rod 11 formed adjacent the screw-threaded end 28. Between the reduced portion 31 and the reduced end 28 the rod is tapered at 32, which tapered surface is adapted to engage the receding ends of the springs 30 to spread the friction shoes 25 outwardly upon proper rotation of the tubular member 10. At the outer end of the reduced portion 31 the rod is tapered outwardly as at 33, and engages the tapered walls 34 formed upon the inner portion and at the outer end of the friction shoes 25, so that by rotating the tubular member 10 in a direction opposite to that heretofore described, the friction of the friction shoes 25 against the inner surface of the tubular member 10 may also be regulated. It will, therefore, be seen that the friction between the tubular member 10 and the rod 11 can be regulated by rotation of the tubular member in either direction and that at a certain point, as shown in Fig. 4, when there is substantially no force applied to the springs 30, the friction is at a minimum, so that the rod 11 may be freely moved longitudinally within the tubular member 10 and the amount of rotation of the tubular member 10, in either direction, determines the degree of friction between the friction shoes 25 and the tubular member 10.

The particular shape of the springs 30 is important, the receding end portions thereof being properly positioned with respect to the tapered surfaces 32 and 33 of the rod 11, so that as the tapered portion 33 of the rod 11 acts against the receding end portions of the springs 30 to spread the friction shoes 25 outwardly as the tubular member 10 is properly rotated, a substantially equal force is transmitted to the opposite ends of the springs 30, thereby expanding the friction shoes 25 equally throughout the length to increase the friction between the shoes and the tubular member. This arrangement causes the friction shoes 25 to engage along their entire contacting surfaces with substantially equal force so that a greater friction surface is provided and a finer adjustment afforded.

The same result occurs as just described, when the tapered portion 32 is brought into engagement with the opposite receding end portions of the springs 30 upon rotation of the tubular member 10 in the opposite direction.

To prevent the possibility of disengagement between the rod 11 and the friction shoes 25, an annular head 35 is secured to the extension 36 on the inner end of the rod so that, should the tubular member 10 be rotated in one direction too far, the head 35 will abut the end of the friction shoes 25 and thereby prevent possible disengagement between the rod and the friction shoes.

It is believed that the operation of the adjuster will be readily understood from the foregoing description and further explanation is deemed unnecessary.

Having thus described my invention, I claim:

1. A casement adjuster comprising an outer tubular member rotatably mounted upon an attaching bracket, an inner member slidable within said tubular member and having its extended end mounted upon a second bracket, and friction means carried by said inner member and engaging the outer tubular member, the rotation of said outer tubular member in either direction increasing the friction between the friction means and said outer tubular member.

2. A casement adjuster comprising an outer tubular member rotatably mounted upon an attaching bracket, an inner member slidable within said tubular member and having its extended end mounted upon a second bracket, and friction means carried by said inner member and engaging the outer tubular member, the rotation of said outer tubular member in either direction increasing the friction thereby controlling the relative longitudinal movement between the outer tubular member and said inner member.

3. A casement adjuster comprising an outer member, an inner rod slidably mounted within said outer member, friction shoes having longitudinally extending cooperating bores screw-threaded at their inner ends, said rod extending through said bores and in screw-threaded engagement therewith, and means carried by said friction shoes and engageable with portions of said rod, the rotation of said tubular member causing said friction shoes to expand uniformly throughout their entire length.

4. A casement adjuster comprising an outer member, an inner rod slidably mounted within said outer member, friction shoes having longitudinally extending cooperating bores, oppositely disposed resilient members having parallel portions and receding ends mounted in said friction shoes, said rod extending through said bores and in adjustable engagement with said shoes, the rod having a reduced portion engaging said parallel portions of said resilient members, and tapered portions on said rod adapted to be moved into engagement with said receding ends upon rotation of said tubular member to expand said shoes uniformly to thereby regulate the friction of said shoes with respect to said tubular member.

5. In a casement adjuster, the combination of an outer member, an inner member mounted for slidable movement in said outer member, shoes arranged around said inner member adjacent the end thereof for frictional engagement with said outer member, and means carried by said shoes adapted to engage one portion of said inner member upon rotation of said outer member in one direction and adapted to engage another portion of said inner member upon rotation of said outer member in the other direction whereby the frictional engagement between said shoes and said outer member may be increased by rotation of said outer member in either direction.

In testimony whereof, I hereunto affix my signature.

GUY A. WELLMAN.